(12) United States Patent
Daniels et al.

(10) Patent No.: US 7,994,439 B2
(45) Date of Patent: Aug. 9, 2011

(54) WEIGHT SCALE WITH DIFFERENTIAL DISPLAY

(75) Inventors: Donald Wayne Daniels, Visalia, CA (US); James Greg Nunley, Tulare, CA (US)

(73) Assignee: Great Valley Land Company, LLC, Visalia, CA (US)

( * ) Notice: Subject to any disclaimer, the term of this patent is extended or adjusted under 35 U.S.C. 154(b) by 315 days.

(21) Appl. No.: 12/341,230

(22) Filed: Dec. 22, 2008

(65) Prior Publication Data

US 2009/0178858 A1 Jul. 16, 2009

Related U.S. Application Data

(60) Provisional application No. 61/021,440, filed on Jan. 16, 2008.

(51) Int. Cl.
*G01G 19/415* (2006.01)
(52) U.S. Cl. ............... 177/25.13; 177/25.16; 177/25.19; 128/921
(58) Field of Classification Search ............... 177/25.13, 177/25.16, 25.19; 128/921
See application file for complete search history.

(56) References Cited

U.S. PATENT DOCUMENTS

| | | | |
|---|---|---|---|
| 3,655,003 A * | 4/1972 | Yamajima | 177/173 |
| 4,301,879 A | 11/1981 | Dubow | |
| 4,318,447 A | 3/1982 | Northcutt | |
| 4,366,873 A * | 1/1983 | Levy et al. | 177/25.19 |
| 4,423,792 A | 1/1984 | Cowan | |
| 4,576,244 A | 3/1986 | Zeigner et al. | |
| 6,354,996 B1 * | 3/2002 | Drinan et al. | 600/300 |
| 6,538,215 B2 | 3/2003 | Montagnino et al. | |
| 6,617,530 B1 | 9/2003 | Lin | |
| 7,265,301 B2 | 9/2007 | Simberg | |
| 2005/0006152 A1 | 1/2005 | Edeiry | |
| 2006/0006005 A1* | 1/2006 | Dumornay et al. | 177/25.13 |
| 2007/0074911 A1* | 4/2007 | Simberg | 177/25.19 |
| 2009/0044987 A1 | 2/2009 | Taylor et al. | |

OTHER PUBLICATIONS

International Searching Authority, International Search Report, Nov. 18, 2008, PCT/CA2008/001473.
Internatinoal Searching Authority, The Written Opinion of the International Searching Authority, Nov. 18, 2008, PCT/CA2008/001473.
Weight Loss Observer, Mary Lou's Weigh Launched Jun. 21, 2008, http://weightlossobserver.com/2008-06-21/g10404_Mary-Lous-Weigh-Launched/.

* cited by examiner

*Primary Examiner* — Randy W Gibson
(74) *Attorney, Agent, or Firm* — Thomas, Kayden, Horstemeyer & Risley, LLP

(57) ABSTRACT

Disclosed are various embodiments of a weight scale with differential display. A first weight is determined for a user from a weight sensor. The first weight is stored in a memory. A second weight is determined for the user from the weight sensor. A difference is determined between the first weight and the second weight. The difference is communicated to the user through an output device.

24 Claims, 5 Drawing Sheets

WEIGHT SCALE WITH DIFFERENTIAL DISPLAY

CROSS REFERENCE TO RELATED APPLICATIONS

This Patent Application claims priority to U.S. Provisional Patent Application No. 61/021,440 filed on Jan. 16, 2008 entitled "THE ZERO SCALE," which is incorporated herein by reference in its entirety.

BACKGROUND

The body weight or body mass of a person has many important health implications. Depending on his or her body weight, a person may be classified as, for example, severely underweight, underweight, normal weight, overweight, obese, or morbidly obese. Some of these categories are associated with greatly increased health risks. How much one weighs also can affect how society views the person and how the person views himself or herself. Thus, millions of people are currently seeking to lose body weight, each with an eye toward losing a certain number of pounds by diet and/or exercise.

Weight scales allow users to track weight gain or loss by allowing users to determine their current body weight, which may then be manually compared with the results of previous weighings. Additionally, weight scales allow users the ability to track their progress with a finer granularity than with mere physical appearance or how clothes fit.

SUMMARY

Briefly described, one embodiment, among others, is a method for communicating a difference in weight values to a user. The method comprises determining a first weight for a user from a weight sensor, storing the first weight in a memory, determining a second weight for the user from the weight sensor, and determining a difference between the first weight and the second weight. The difference is communicated to the user through an output device.

Another embodiment is a weight scale. The weight scale comprises a controller having a processor and a memory, the controller being coupled to an input device, an output device, and at least one weight sensor. The weight scale further comprises a scale application executable in the controller. The scale application comprises logic that determines a first weight of a user from the at least one weight sensor, logic that stores the first weight in the memory, logic that determines a second weight of the user from the at least one weight sensor, and logic that communicates a difference between the first weight and the second weight to the user through the output device.

Another embodiment is also a weight scale. The weight scale comprises a means for comparing weights and a means for communicating a differential value to a user based on the comparison.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Many weight scales go unused because many users who consider themselves overweight, particularly females, have a fear of seeing their own actual body weight. This may be due to stigmas associated with certain weights, such as two hundred pounds, etc. This may also be due to the user remembering a past weight and fearing exceeding it. Without a way to track the weight loss from a diet and/or exercise plan, many people may not be able to meet their goals.

A weight scale with a differential display overcomes these difficulties by not displaying the current weight of the user. Instead, the weight scale with a differential display shows the difference between the current weight of the user and some previous weight of the user. This allows the user to concentrate on his or her progress and not be worried about seeing a number exceeding some threshold.

Some users may have a predetermined goal for weight loss. For example, someone may want to lose fifteen pounds in order to fit in a smaller pair of jeans. As another example, a doctor might tell a patient to lose fifty pounds in order to reduce his or her risk of having a cardiovascular event. A weight scale with a differential display may have the capability of comparing the current differential weight with a goal value predetermined by the user and reporting progress toward that goal.

In contrast to the common case of a user wanting to lose weight, a weight scale with a differential display may also be desirable for a user wanting to gain weight. Such users may be recovering from an eating disorder such as anorexia or bulimia or may simply want to build a heftier physique. In any case, because of stigma associated with seeing a small weight at the beginning or a progressively increasing weight, such users may want to see a differential weight and compare that to a goal. In the following discussion, a general description of the system and its components is provided, followed by a discussion of the operation of the same.

Figure 1:
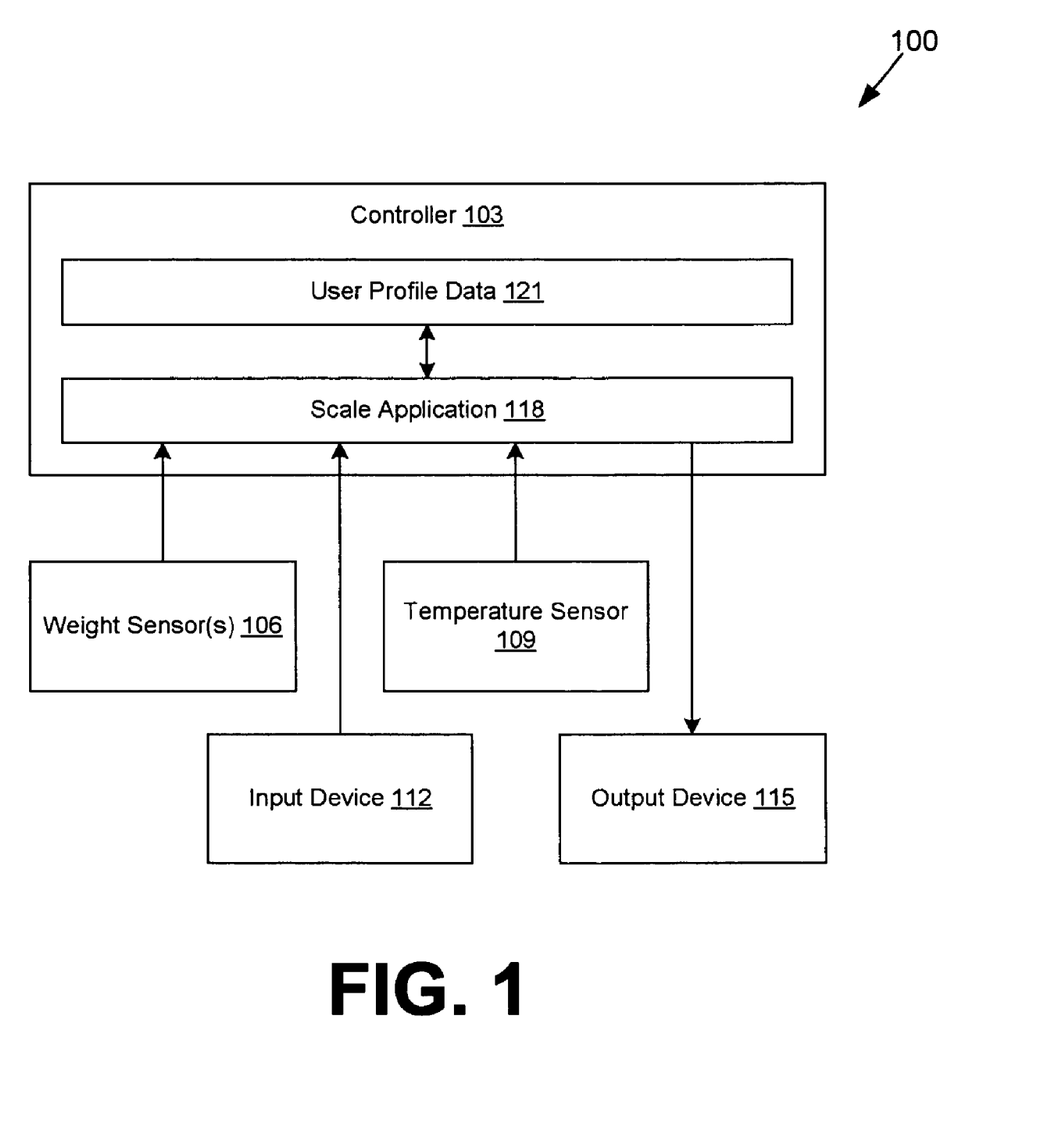
FIG. 1 is a functional block diagram of a weight scale with differential display according to various embodiments of the present disclosure.

With reference to FIG. 1, shown is a functional block diagram of a weight scale with differential display 100 according to various embodiments of the present disclosure. The weight scale with differential display 100 includes a controller 103, the controller 103 being coupled to one or more weight sensors 106, a temperature sensor 109, an input device 112, and an output device 115. The one or more weight sensors 106, the temperature sensor 109, the input device 112, and the output device 115 may be integrated in the same apparatus as the controller 103 or they may be separate.

The controller 103 may comprise one or more processor-based systems with memory and input and output channels. In one embodiment, the controller 103 is implemented as a microcontroller on a single chip. In another embodiment, the controller 103 is implemented as a general-purpose computer. In another embodiment, the controller 103 is a server computer connected to the one or more weight sensors 106, the temperature sensor 109, the input device 112, and/or the output device 115 over a data communications network such as the Internet. In yet another embodiment, the controller 103 may be implemented as a plurality of digital logic circuits with an associated memory.

The controller 103 includes a scale application 118 and user profile data 121. The scale application 118 is executed to receive input from the one or more weight sensors 106, the temperature sensor 109, and the input device 112 and produce a result that is communicated to the user via the output device 115. The scale application 118 may also store data to and load data from the user profile data 121. The user profile data 121 comprises stored profile settings associated with one or more users. For each user, the user profile data 121 may comprise one or more previous weights, dates and/or timestamps associated with previous weighings, a goal weight and/or goal differential weight, and potentially other data.

The one or more weight sensors 106 comprise sensors adapted to receive a mechanical force and translate it into an electrical signal. In some embodiments, the output of the weight sensors 106 may be a number representing weight in a particular system of measurement. Alternately, the controller 103 may perform translation of the output to weight in the particular system of measurement.

In some embodiments, each weight sensor 106 may comprise an analog-to-digital signal converter. In other embodiments, all weight sensors 106 may be coupled together, with the output being sent to a single analog-to-digital signal converter or to an input port of the controller 103. In other embodiments, the output signals of weight sensors 106 may be coupled directly to the controller 103, which may include one or more analog-to-digital signal converters.

In some embodiments, the weight scale with differential display 100 may comprise a single weight sensor 106, two weight sensors 106, three weight sensors 106, four weight sensors 106, etc. The quantity of weight sensors 106 may be selected for optimum stability of the weight scale with differential display 100 relative to the floor. The quantity of weight sensors 106 may also be selected for maximum accuracy or some other reason.

The weight scale with differential display 100 may have a temperature sensor 109 to be used by the controller 103 to correct for temperature-dependent errors in the signals from the weight sensors 106. In various embodiments not affected by temperature-dependent errors, the temperature sensor 109 may be absent.

The input device 112 may comprise one or more buttons or switches, a keyboard, a keypad, a mouse, a voice-command recognition system, and/or any other device adapted to receive user input. In particular, the input device 112 may be foot operated, hand operated, voice operated, and/or operated in some other way. In some embodiments, the input device 112 may comprise a device designed to recognize a user automatically by weight or some other characteristic that distinguishes users.

The output device 115 may comprise any one or a plurality of devices by which results of the weighing process can be communicated to a user. Such an output device 115 may comprise a display device such as a liquid crystal display (LCD) screen, a light-emitting diode (LED) display, a cathode-ray tube (CRT) monitor, or some other visual output device. In some embodiments, the output device 115 may comprise an audio generation device to communicate results to the user by sound.

Next, a general discussion of the operation of the various components of the weight scale with differential display 100 is provided. To begin, a user steps onto a scale, applying force to the weight sensors 106. The weight sensors 106 generate a signal that is sent to the scale application 118 executing on the controller 103. In the case that this is the first time of the user weighing on the weight scale with differential display 100, the user may select a particular user profile to reset with the input device 112. For example, a user may push, and, in some cases, hold down for a brief period until a reset indicator of output device 115 is triggered, one of a plurality of buttons comprising the input device 112, which may be associated with a first user profile. The user profile selection may be performed before or after the user steps onto the scale.

In various embodiments, there may be a default user profile if none is selected. Additionally, the input device 112 may be configured to associate a user with a user profile without any separate user interaction. Further, in some embodiments, without a selection of a user profile, the scale may default into a guest mode, wherein the scale is operable as an ordinary scale, displaying the current weight of the user through the output device 115. Such a guest mode may be user selectable with the input device 112, for example, by the use of a button.

If a user profile has been determined, then the scale application 118 may store the weight value or values received from the weight sensors 106 in the user profile data 121 associated with the particular user profile. In some embodiments, weight values from each of one or more weight sensors 106 are stored and/or are averaged by the scale application 118 to yield a single value. The stored value may or may not be converted to particular units, such as kilograms or pounds. In various embodiments, the scale application 118 may also store a timestamp value, date value, and/or other data along with the weight value.

Before, during, or after the weighing, the user may be prompted by the output device 115 to enter a goal weight using the input device 112. As a nonlimiting example, the user may be able to speak the weight and have the input device 112 recognize the value. As another nonlimiting example, the user may input the weight through buttons comprising the input device 112. The goal weight may represent an absolute weight value, or a difference value. In the case that the goal weight is a difference value, the goal weight may be a gain or loss, or positive or negative in some embodiments. Also, the input device 112 may allow the user to select the units used with the goal weight, for example, kilograms or pounds.

Some time later, the user returns to the weight scale with differential display 100. The user steps onto the scale, and the weight sensors 106 transmit a weight signal to the controller 103. However, unless a guest mode as described above is triggered, no indication of the weight value is communicated to the user through the output device 115.

Before, during, or after the weighing, the user may select a user profile with the input device 112. As a nonlimiting example, this selection may involve pressing a button corresponding to a particular profile on the input device 112. As another nonlimiting example, this selection may involve speaking into the input device 112. Once the scale application 118 identifies a particular user profile, one or more stored weight values and/or other data are loaded from the user profile data 121.

The difference between the current weight value and a stored weight value is calculated, and this difference value is communicated to the user through the output device 115. The difference value may be calculated and communicated multiple times in some embodiments until the current weight value from the weight sensors 106 stabilizes. As a nonlimiting example, the difference value may be communicated to the user through the output device 115 as a number displayed on an LCD screen or an LED display. In some embodiments, the display of the number may comprise a plurality of seven-segment displays. The difference value may comprise any number of fractional digits. As another nonlimiting example, the difference value may be communicated to the user through the output device 115 as an audible representation of the value.

By communicating only the difference value to the user without the actual current weight value, the weight scale with differential display 100 communicates only the salient information relative to the progress of the user. This may avoid subjecting the user to unnecessary distress associated with seeing the actual weight value. Such distress may cause a user, for example, to stop monitoring his or her progress, or even to cease weight loss efforts altogether. Thus, the weight scale with differential display 100 advantageously promotes continued use.

The difference value may be in any standard unit for measuring weight, such as pounds or kilograms. Which measuring unit is being currently used may be communicated through the user through the output device 115. In some embodiments, the difference value may be communicated in a plurality of measuring units, such as both pounds and kilograms. In other embodiments, which measuring unit is used may be configured through, for example, a switch or other input mechanism for input device 112.

The difference value, if nonzero, will be associated with either a weight gain or loss. The output device 115 may have an indicator to inform the user as to whether the difference value is a gain or a loss. Such an indicator may be, for example, an LED indicator, an LCD display element, and/or other indicators.

Along with the difference value, the output device 115 may be configured to communicate the time that has elapsed since the previous weight value used in computing the difference value was stored in user profile data 121. This elapsed time may be expressed as, for example, days, weeks, months, etc. Further, in one embodiment, the units used may depend on the length of the time period. As a nonlimiting example, if the time is less than a day, hours may be used, whereas if the time is greater than a day and less than a week, days may be used, etc.

Additionally, the output device 115 may be configured to communicate the progress of the user with respect to a predetermined goal value. The progress may be calculated by the scale application 118 using the goal value with either the current weight value or the difference value, depending on how the goal value is stored, as, for example, an absolute weight value or a difference value. A goal progress indicator may be, for example, a value of weight remaining to gain or lose, a percentage of the goal, etc. A percentage of the goal may be represented as, for example, a numerical percentage, a graphical status indicator, etc.

In various embodiments, the weight scale with differential display 100 may be configured to communicate the progress of the user in other weighings subsequent to the initial weighing. The scale application 118 may be configured to store the difference value and/or the actual weight from the weighing, along with date/time data, in the user profile data 118, for the particular user. Whether such values are stored may be determined automatically by the scale application 118 or may be a user option obtained from the user by input device 112. The input device 112 may allow the user to select previous weighings, in addition to the initial weighing, for communication of the difference value and elapsed time computed from the previous weighing. Such a feature permits a user to track his or her progress both since a goal was established and since the previous week, for example.

Figure 2:
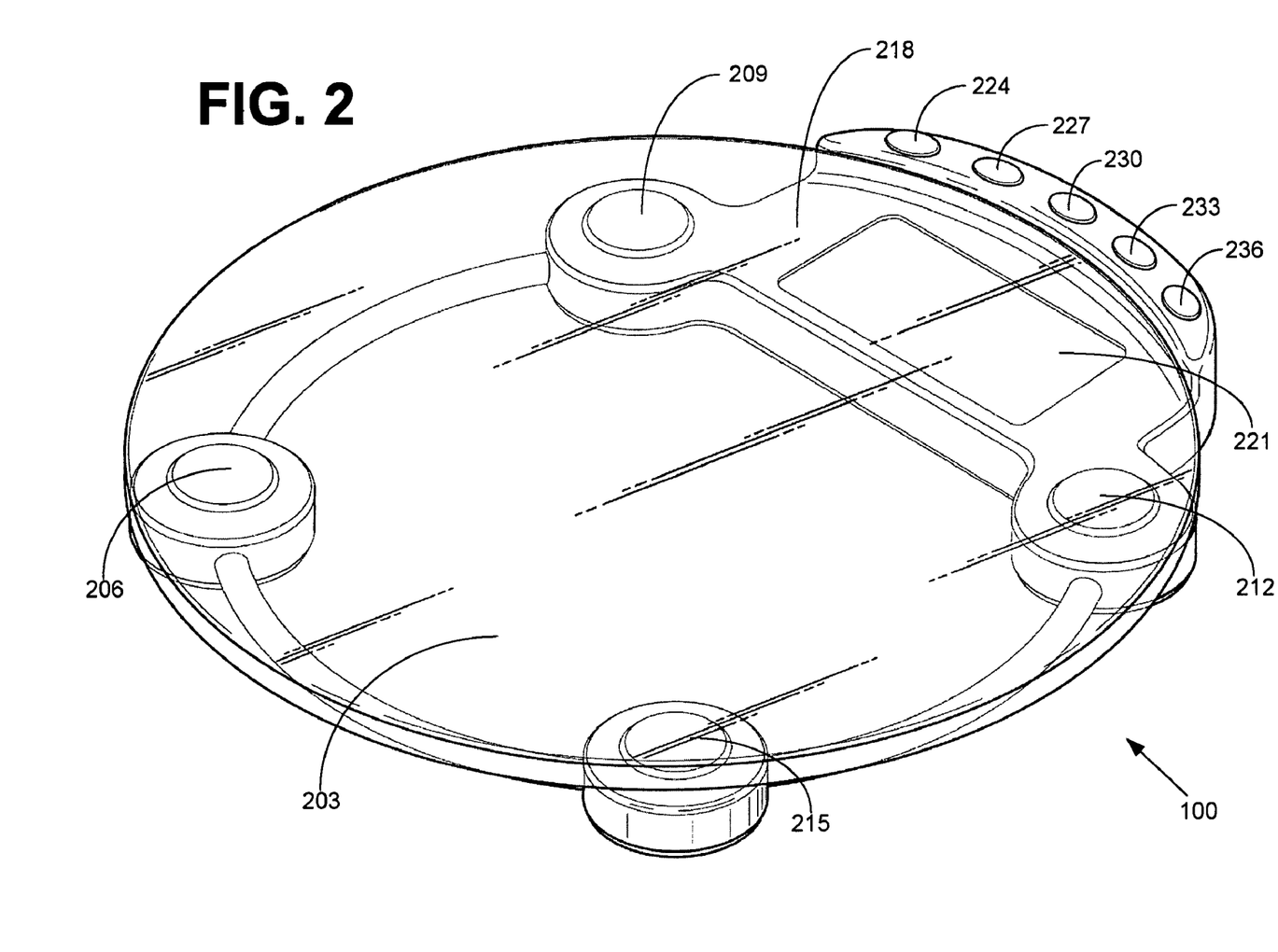
FIG. 2 is a perspective view of the weight scale with differential display of FIG. 1 according to various embodiments of the present disclosure.
Figure 3:
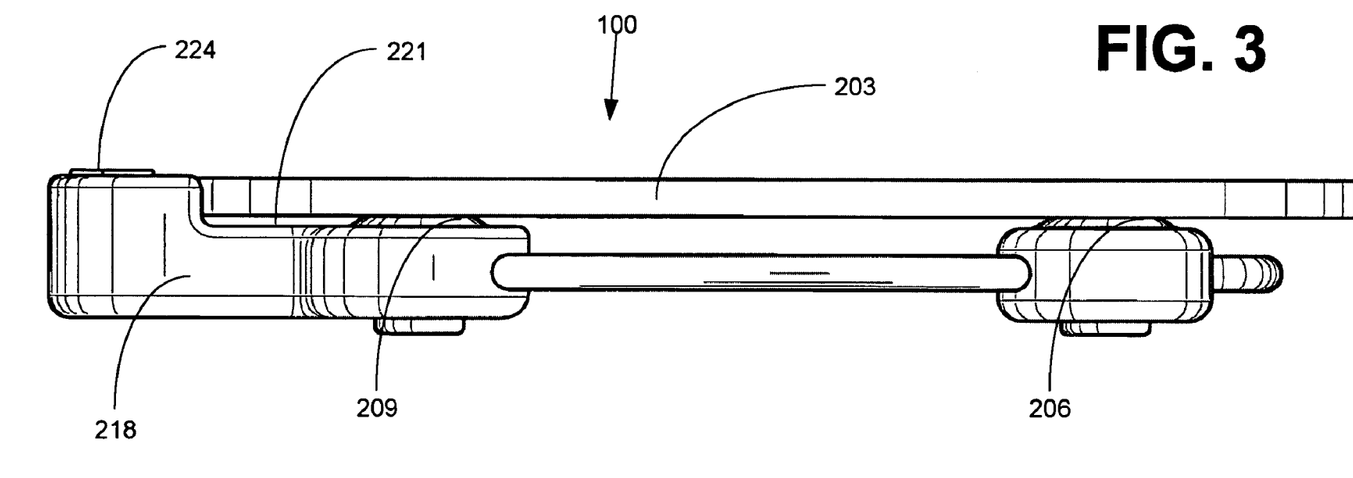
FIG. 3 is a side view of the weight scale with differential display of FIG. 1 according to various embodiments of the present disclosure.

Moving now to FIGS. 2 and 3, shown are a perspective view (FIG. 2) and a side view (FIG. 3) of the weight scale with differential display 100 (FIG. 1) according to various embodiments of the present disclosure. The weight scale with differential display 100 may include a surface 203, a plurality of scale feet 206, 209, 212, and 215, a scale body 218, a display screen 221, a plurality of buttons 224, 227, 230, 233, and 236, and/or other components.

When a user steps onto the surface 203, force is applied to each of the scale feet 206, 209, 212, and 215 located under the surface 203. In this embodiment, each of the scale feet 206, 209, 212, and 215 comprise a separate weight sensor 106 (FIG. 1). As described in connection with FIG. 1, one or more weight signals are sent to the controller 103 (FIG. 1). The controller 103 may be located within the scale body 218.

The display screen 221 is an LCD screen implementing display functions of the output device 115 (FIG. 1). The buttons 224, 227, 230, 233, and 236 implement input functions of the input device 112 (FIG. 1). Additionally, the input device 112 may comprise additional buttons or switches not shown on the drawing of the weight scale with differential display 100. Each of the buttons 224, 227, 230, 233, and 236 may be associated with a particular user profile, through one of the buttons 224, 227, 230, 233, and 236 may be associated with a guest mode. Furthermore, the buttons 224, 227, 230, 233, and 236 may allow the user to input a goal weight and/or perform additional configuration in some embodiments. In some embodiments, the buttons 224, 227, 230, 233, and 236 may comprise part of the output device 115 to display to the user which profile or mode is currently active.

Figure 4:
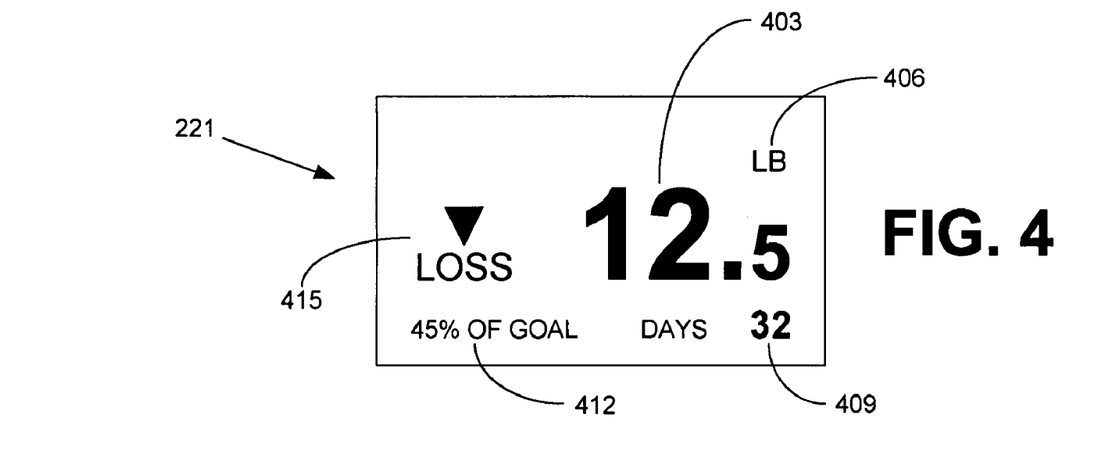
FIG. 4 is a drawing of one example of an output device used in the weight scale with differential display of FIG. 1 according to various embodiments of the present disclosure.

Turning now to FIG. 4, shown is a drawing of one example of an output device 115 (FIG. 1) used in the weight scale with differential display 100 (FIG. 1) according to various embodiments of the present disclosure. In particular, FIG. 4 depicts a display screen 221 (FIG. 2), which may be, for example, an LCD. The display screen 221 may include a weight value 403, a units indicator 406, a time indicator 409, a goal progress indicator 412, a gain/loss indicator 415, and/or potentially other display elements.

The weight value 403 shows a number representing the amount of weight gained or lost since a previous weighing of a user. In this example, the weight value 403 shows "12.5." It is understood that there are many ways to express such a number. In some embodiments, the weight value 403 may have additional or fewer decimal digits, and the number of digits may be configurable. When the weight scale with differential display 100 is in a guest mode, the weight value 403 may depict the current weight of the user. Also, when the weight scale with differential display 100 is receiving a goal weight gain or loss from the user, the weight value 403 may display the currently selected goal value.

The units indicator 406 shows the system of weight units used in the weight value 403. Here, the units indicator 406 depicts "LB" for pounds. Depending on user configuration, the units indicator 406 may instead depict "KG" for kilograms or some other indication, which may be associated with another weight measuring unit.

The time indicator 409 displays the time that has elapsed since a previous weighing for the user. Here, the time period is given in days, but it is understood that other units, such as hours or weeks, may be used. The user may be able to select other previous weighings as the basis for computing the weight value 403, and the time indicator 409 may update to reflect the change in time periods.

The goal progress indicator 412 shows the progress of the user in reaching a goal based on the current weight of the user. In this example, the goal progress indicator 412 displays the percentage of the goal currently attained. Here, "45% OF GOAL" is displayed. In other embodiments, the goal progress indicator 412 may be a graphical display such as progress bar or some other display. In other embodiments, the goal progress indicator 412 may merely indicate that a goal has been attained or has not yet been attained.

The gain/loss indicator 415 displays whether the weight value 403 represents a gain or loss. In this example, the gain/loss indicator 415 shows a loss with a down arrow and the word "LOSS." In other embodiments, the gain/loss indicator 415 may show a plus or minus, just "gain" or "loss," or some other appropriate indication. If there is no gain or loss, or if guest mode is active, the gain/loss indicator 415 may display, for example, nothing at all.

It is understood that the above-described display elements of the display screen 221 may be absent from some embodiments. Also, the visual arrangement of the display elements depicted in FIG. 4 is given as merely an example, and it is noted that many such arrangements are possible in other embodiments.

Figure 5:
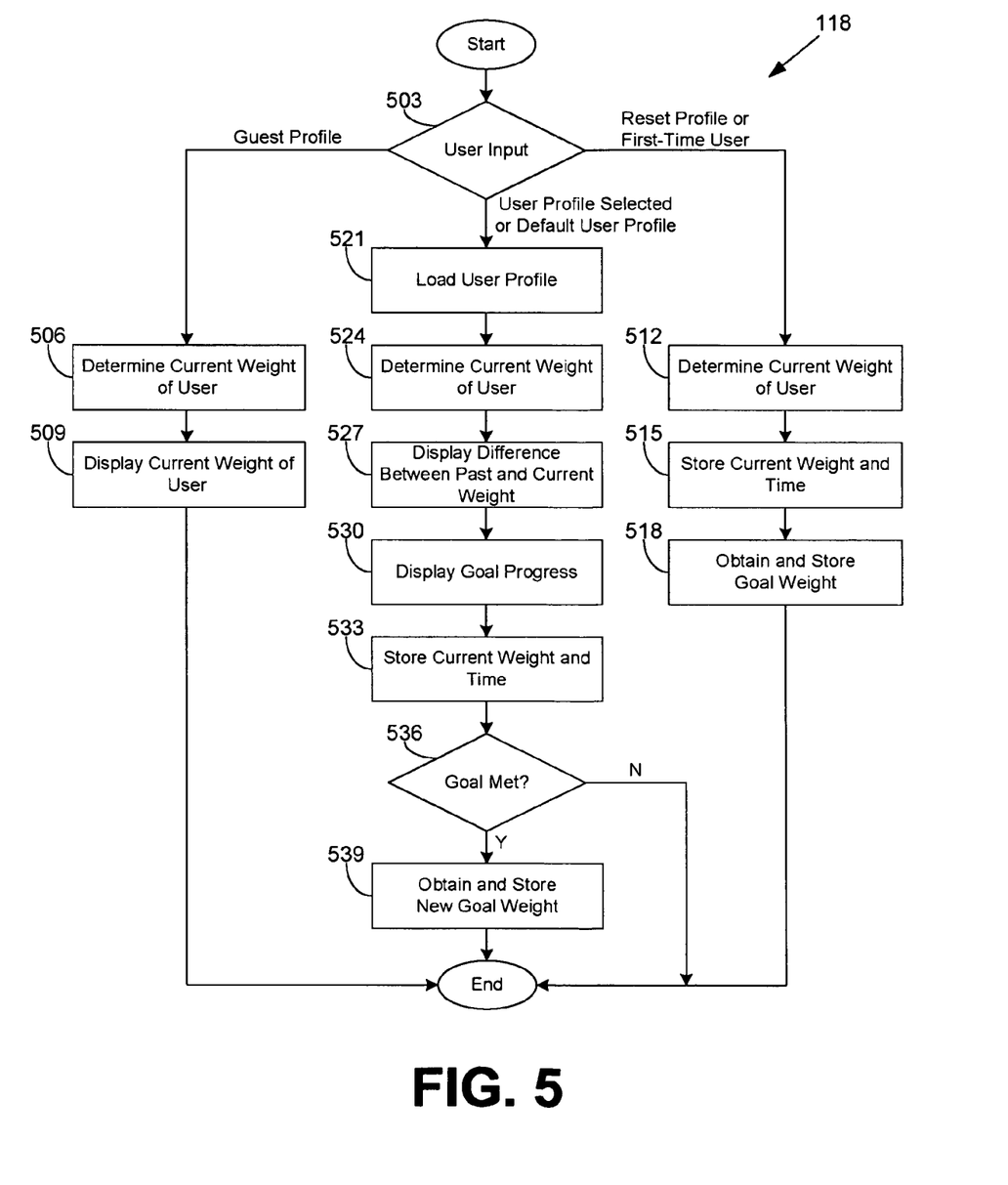
FIG. 5 is a flowchart that provides one example of a scale application implemented in the controller employed in the weight scale with differential display of FIG. 1 according to various embodiments of the present disclosure.

With reference to FIG. 5, shown is a flowchart that provides one example of a scale application 118 (FIG. 1) implemented in the controller 103 (FIG. 1) employed in the weight scale with differential display 100 (FIG. 1) according to various embodiments. It is understood that the flowchart of FIG. 5 merely provides an example of the many different types of functional arrangements that may be employed to implement the operation of the scale application 118 as described herein. As an alternative, the flowchart of FIG. 5 may be viewed as depicting an example of steps of a method implemented in the controller 103 according to one or more embodiments.

To begin, in box 503, the scale application 118 receives some type of user input indicating a user profile selection from the input device 112 (FIG. 1). Alternatively, the scale application 118 may first receive a weight signal from the weight sensors 106 (FIG. 1) and no explicit user profile selection.

If the scale application 118 determines, in box 503, that a guest profile or mode is to be used, then the scale application 118 proceeds to box 506 and determines the current weight of the user based upon a weight signal received from the weight sensors 106. In box 509, the scale application 118 displays the current weight of the user on, for example, a display screen 221 (FIG. 4). In some embodiments, the scale application 118 may communicate the current weight of the user by audio or some other method using an output device 115 (FIG. 1). The scale application 118 ends.

If, instead, the scale application 118 determines, in box 503, that the user is a first-time user or is resetting an existing user profile, then the scale application 118 proceeds to box 512 and determines the current weight of the user based upon a weight signal received from the weight sensors 106. Next, in box 515, the scale application 118 stores the current weight value and time in the user profile data 121 (FIG. 1) associated with the current user profile. In other embodiments, a current date, timestamp, or other time value may be stored. Then, the scale application 118 obtains a goal weight loss or gain from the user through input device 112 and stores the value in the user profile data 121 associated with the current user profile. The scale application 118 ends.

If, instead, the scale application 118 determines, in box 503, that an existing user profile has been selected or that a default user profile is to be used, then the scale application 118 proceeds to box 521 and loads the user profile from the user profile data 121. Next, in box 524, the scale application 118 determines the current weight of the user based upon a weight signal received from the weight sensors 106. Then, in box 527, the scale application 118 displays the difference between a past weight of the user and the current weight of the user. As a nonlimiting example, the difference in weights may be displayed on a display screen 221 as a weight value 403. In some embodiments, the scale application 118 may communicate the difference in weights by audio or some other method using an output device 115. Additionally, the scale application 118 may indicate on the output device 115 whether the difference in weights represents a gain or loss and the length of time between the previous weighing and the current weighing.

Moving to box 530, the scale application 118 may display the progress of the user toward the goal based on the difference between the current weight and the initial weight and the goal weight loss or gain loaded from the user profile data 121. The scale application 118 uses, for example, a goal progress indicator 412 (FIG. 4) to communicate this information to the user. Next, in box 533, the scale application 118 stores the current weight value and time in the user profile data 121 associated with the current user profile. In other embodiments, a current date, timestamp, or other time value may be stored.

In box 536, the scale application 118 determines whether the user has met his or her goal. If the user has not met his or her goal for weight loss or gain, the scale application 118 ends. Otherwise, if the user has met his or her goal, the scale application 118 may then obtain a new goal weight loss or gain from the user through input device 112 and store the value in the user profile data 121 associated with the current user profile. Then, the scale application 118 ends.

Figure 6:
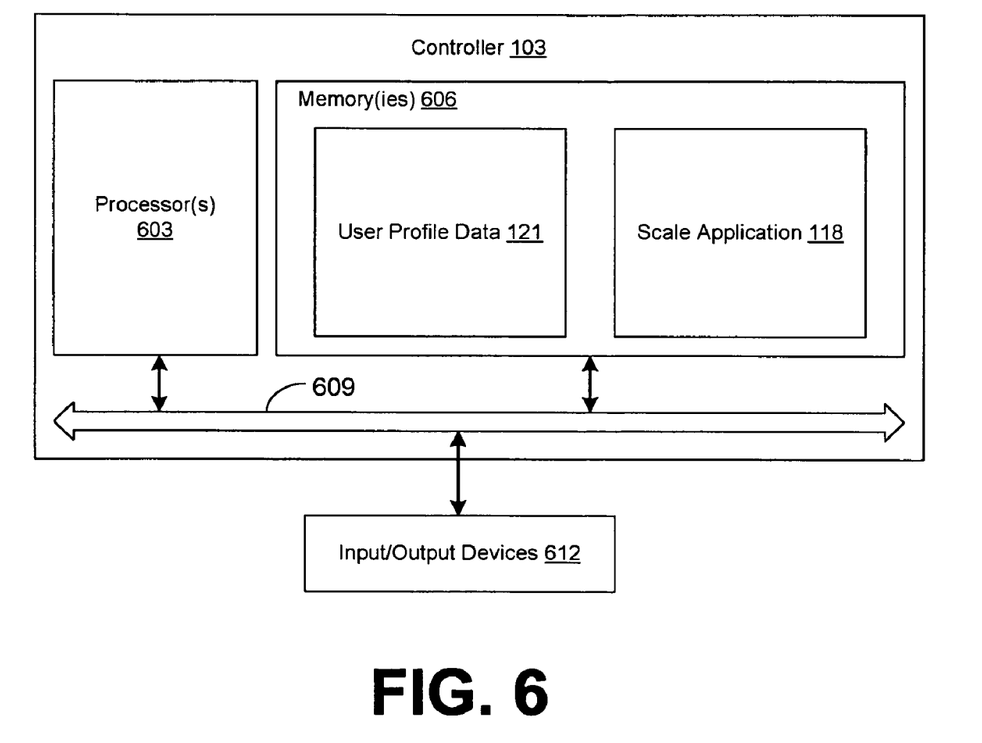
FIG. 6 is a schematic diagram that provides one example of the controller employed in the weight scale with differential display of FIG. 1 according to various embodiments of the present disclosure.

Referring next to FIG. 6, shown is a schematic block diagram of one example of a controller 103 (FIG. 1) according to an embodiment of the present disclosure. The controller 103 includes a processor circuit, for example, having a processor 603 and a memory 606, both of which are coupled with a local interface 609. Controller 103 may comprise, for example, a microcontroller or a general purpose computer with such a structure. The local interface 609 may comprise, for example, a data bus with an accompanying address/control bus or other bus structure. The local interface 609 is also coupled with a plurality of input/output devices 612. The input/output devices 612 may comprise, for example, weight sensors 106 (FIG. 1), temperature sensor 109 (FIG. 1), input device 112 (FIG. 1), output device 115 (FIG. 1), and/or potentially other devices.

Stored within the memory 606 are both executable components and data. In particular, stored in the memory 606 and executable by the processor 603 are the scale application 118 (FIG. 1) and potentially other applications. Also stored in the memory 606 are the user profile data 121 (FIG. 1) and other data. In addition, an operating system may be stored in the memory 606 and executable by the processor 603.

It is understood that there may be other applications stored in the memory 606 and executable by the processor 603. Also, other data may be stored in the memory 606 and accessed by the processor 603 associated with the operation of the scale application 118. The scale application 118 may be implemented using any one of, or a combination of, a number of programming languages such as, for example, C, C++, C #, Visual Basic, VBScript, Java, JavaScript, Perl, Ruby, Python, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the various components executed on the controller 103 as described above are embodied in software or code executed by general purpose hardware as discussed above, as an alternative the various components executed on the controller 103 as described above may also be embodied in dedicated hardware or a combination of software/general purpose hardware and dedicated hardware. If embodied in dedicated hardware, the various components executed on the controller 103 as described above can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the architecture, functionality, and operation of an implementation of the scale application 118 as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various components executed on the controller 103 as described above comprise software or code, they can be embodied in any computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various components executed on the controller 103 as described above for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
    determining a first weight for a user from a weight sensor;
    storing the first weight in a memory;
    determining a second weight for the user from the weight sensor;
    determining a difference between the first weight and the second weight;
    communicating the difference to the user through an output device;

storing a goal in the memory; and communicating a goal progress indication to the user through the output device based on the goal and the difference.

2. The method of claim 1, wherein neither the first weight nor the second weight is communicated to the user at any time.

3. The method of claim 1, further comprising the steps of:
indicating a weight gain to the user through the output device when the second weight is greater than the first weight; and
indicating a weight loss to the user through the output device when the second weight is less than the first weight.

4. The method of claim 1, further comprising the steps of:
storing the second weight in the memory;
determining a next weight for the user from the weight sensor;
determining a next difference between the second weight and the next weight; and
communicating the next difference to the user through the output device.

5. The method of claim 1, further comprising the step of communicating to the user through the output device a time that has elapsed between when the first weight was determined and when the second weight was determined.

6. The method of claim 1, further comprising the steps of:
associating a user profile with the user; and
loading the first weight from the memory based on the user profile.

7. A weight scale, comprising:
a controller having a processor and a memory, the controller being coupled to an input device, an output device, and at least one weight sensor;
a scale application executable in the controller, the scale application comprising:
logic that determines a first weight of a user from the at least one weight sensor;
logic that stores the first weight in the memory;
logic that determines a second weight of the user from the at least one weight sensor;
logic that communicates a difference between the first weight and the second weight to the user through the output device;
logic that stores a goal in the memory; and
logic that communicates a goal progress indication to the user through the output device based on the goal and the difference.

8. The weight scale of claim 7, wherein neither the first weight nor the second weight is communicated to the user at any time.

9. The weight scale of claim 7, wherein the scale application further comprises:
logic that indicates a weight gain to the user through the output device when the second weight is greater than the first weight; and
logic that indicates a weight loss to the user through the output device when the second weight is less than the first weight.

10. The weight scale of claim 7, wherein the scale application further comprises logic that communicates to the user through the output device a time that has elapsed between when the first weight was determined and when the second weight was determined.

11. The weight scale of claim 7, wherein the scale application further comprises:
logic that stores the second weight in the memory;
logic that determines a next weight for the user from the weight sensor;
logic that determines a next difference between the second weight and the next weight; and
logic that communicates the next difference to the user through the output device.

12. The weight scale of claim 7, wherein the scale application further comprises logic that receives a user profile selection from the input device.

13. The weight scale of claim 12, wherein the scale application further comprises logic that receives a reset indication for the user profile selection from the input device.

14. The weight scale of claim 7, wherein the scale application further comprises:
logic that receives a guest mode selection from the input device;
logic that determines a current weight for a guest user from the weight sensor; and
logic that communicates the current weight to the guest user through the output device.

15. The weight scale of claim 7, wherein the input device comprises a plurality of buttons.

16. The weight scale of claim 7, wherein the output device comprises a display screen.

17. The weight scale of claim 7, wherein the output device comprises an audio generation device.

18. A weight scale, comprising:
means for comparing weights;
means for communicating a differential value to a user based on the comparison;
means for storing a goal in a memory; and
means for communicating a goal progress indication to a user through an output device based on the goal and the differential value.

19. A weigh scale according to claim 18, wherein the weighing mechanism, recording system, comparator and indicator are further configured to indicate the difference in weight using a non-numerical system.

20. A weigh scale according to claim 18, wherein the weighing mechanism, recording system, comparator and indicator are further configured to reset the initial weight to a new value on reaching a predetermined difference in weight.

21. A method of monitoring a weight of a subject according to claim 20, wherein the difference in weight is indicated using a non-numerical system.

22. A method of monitoring a weight of a subject according to claim 20, further comprising resetting the initial weight to a new value on reaching a predetermined difference in weight.

23. A computer-readable medium according to claim 22, further comprising instructions which cause the processor to indicate the difference in weight using a non-numerical system.

24. A computer-readable medium according to claim 22, further comprising instructions which cause the processor to reset the initial weight to a new value on reaching a predetermined difference in weight.

* * * * *